US007367016B2

(12) United States Patent
Meyer et al.

(10) Patent No.: US 7,367,016 B2
(45) Date of Patent: Apr. 29, 2008

(54) METHOD AND SYSTEM FOR EXPRESSING THE ALGORITHMS FOR THE MANIPULATION OF HARDWARE STATE USING AN ABSTRACT LANGUAGE

(75) Inventors: Douglas B. Meyer, San Diego, CA (US); David L. Isaman, San Diego, CA (US); William C. Jackson, Morgan Hill, CA (US)

(73) Assignee: Sun Microsystems, Inc., Santa Clara, CA (US)

(*) Notice: Subject to any disclaimer, the term of this patent is extended or adjusted under 35 U.S.C. 154(b) by 883 days.

(21) Appl. No.: 10/618,829

(22) Filed: Jul. 14, 2003

(65) Prior Publication Data

US 2005/0015778 A1 Jan. 20, 2005

(51) Int. Cl.
*G06F 9/44* (2006.01)
*G06F 11/00* (2006.01)

(52) U.S. Cl. .................. 717/114; 717/135; 714/31; 719/328

(58) Field of Classification Search .............. 717/114, 717/117, 135, 140, 174; 719/328; 714/28, 714/30, 31
See application file for complete search history.

(56) References Cited

U.S. PATENT DOCUMENTS

| 5,224,101 | A | | 6/1993 | Popyack, Jr. |
| 5,267,246 | A | * | 11/1993 | Huang et al. ................. 714/45 |
| 5,467,358 | A | | 11/1995 | Scarra |
| 5,784,382 | A | | 7/1998 | Byers et al. |
| 6,148,204 | A | * | 11/2000 | Urs et al. .................... 455/433 |
| 6,473,727 | B1 | | 10/2002 | Kirsch et al. |
| 6,941,243 | B1 | * | 9/2005 | Maciona et al. ............ 702/182 |
| 7,095,718 | B1 | * | 8/2006 | Terry .......................... 370/241 |
| 2002/0183997 | A1 | * | 12/2002 | Powell et al. ................. 703/13 |
| 2003/0110477 | A1 | * | 6/2003 | Wakabayashi et al. ...... 717/135 |
| 2004/0215440 | A1 | * | 10/2004 | Crowell ....................... 703/22 |

OTHER PUBLICATIONS

Becker et al., "An Engineering Environment for Hardware/Software Co-Simulation", Proceedings of the 29th ACM/IEEE Design Automation Conference, 1992, pp. 129-134.*
Bauer et al., "Hardware/Software Co-Simulation in a VHDL-based Test Bench Approach", Proceedings of the 34th Design Automation Conference, Jun. 1997, pp. 774-779.*
Stroustrup, Bjarne, "The Design and Evolution of C++", Addison-Wesley Inc., 4th Printing, Jun. 1998, ISBN 0-201-54330-3.*

* cited by examiner

*Primary Examiner*—Eric B. Kiss
(74) *Attorney, Agent, or Firm*—Meyertons Hood Kivlin Kowert & Goetzel, P.C.; Stephen J. Curran

(57) ABSTRACT

A method for expressing the algorithms for the manipulation of hardware includes providing program instructions that describe a sequence of one or more transactions for manipulating hardware components of a system. The program instructions may call one or more code segments that include specific information associated with particular hardware components of the system. In addition, the program instructions are independent of the specific information. The method may also include translating the program instructions into an executable form and executing the executable form of the program instructions to manipulate the hardware components of the system from one consistent state to a next consistent state.

29 Claims, 4 Drawing Sheets

METHOD AND SYSTEM FOR EXPRESSING THE ALGORITHMS FOR THE MANIPULATION OF HARDWARE STATE USING AN ABSTRACT LANGUAGE

BACKGROUND OF THE INVENTION

1. Field of the Invention

This invention relates to programming languages and, more particularly, to an abstract language for specifying algorithms for manipulating the hardware state within a system.

2. Description of the Related Art

The hardware elements of a computing machine are generally architected and designed such that certain methods are required to access and manipulate its state in a safe, consistent manner. In most cases, expression of these methods (algorithms) requires not only intimate knowledge of the hardware and the complexities of the interaction between hardware components, but also a detailed understanding of the system specifications.

When software is written to implement all of the hardware manipulation algorithms, programmers frequently do not have the expertise to correctly and efficiently handle the hardware documentation. Thus, software implementation of these manipulation algorithms can be tedious, slow and error-prone.

When working to ensure correct design and operation of the platform, the hardware state transitions and management in many cases is poorly documented, meaning that hardware/system simulation, validation, quality assurance, regression testing, and other activities are left without a single point of reference. For example, system simulation and validation verifies that the hardware operates correctly for all required manipulation algorithms prior to device tape-out. Hardware validation testing of both the entire system and its components are usually done whenever changes are made to the hardware components or the design. The hardware validation tests are typically done far in advance of software engagement, thus the algorithms to manipulate the hardware must be available via other means. Even though the software implementation should match the test algorithms, the hardware test algorithms and the hardware simulations are typically done by different people using their own respective understandings of the hardware design. There is generally no assurance that the hardware architecture and the design meet all the anticipated use cases for it before the software implementation proceeds. In such environments, there is generally no coupling between the algorithms and what software implements during later phases of implementation and thus there is little or no guarantee that the software will necessarily provide the intended result.

Further, when changes occur in the hardware (e.g., system changes, board changes, component changes) there is typically no rigorous means of readily understanding what changes to the hardware manipulation algorithms are required and what testing and regression testing is needed. Thus, currently, even when small changes are made, there may be independent activities in hardware testing, QA testing and software implementation to discover what the impact really is. Thus, there is virtually no way to systematically understand the implications of the changes for all participants.

Typically, the software that is written to manipulate a platform's hardware is derived from a variety of hardware specifications (sometimes of widely variable quality) combined with numerous other platform specifications and hallway conversations. The result must often be iterated upon to get the software right, due to imprecision of definition. Worse still, requiring skilled programmers to understand detailed hardware specifications is a weak link.

SUMMARY OF THE INVENTION

Various embodiments of a method for expressing the algorithms for the manipulation of hardware state are disclosed. In one embodiment, the method includes providing program instructions that describe a sequence of one or more transactions for manipulating hardware components of a system. The program instructions may call one or more code segments that include specific information associated with particular hardware components of the system. In addition, the program instructions are independent of the specific information. The method may also include translating the program instructions into an executable form and executing the executable form of the program instructions to manipulate the hardware components of the system from one consistent state to a next consistent state.

Figure 1:
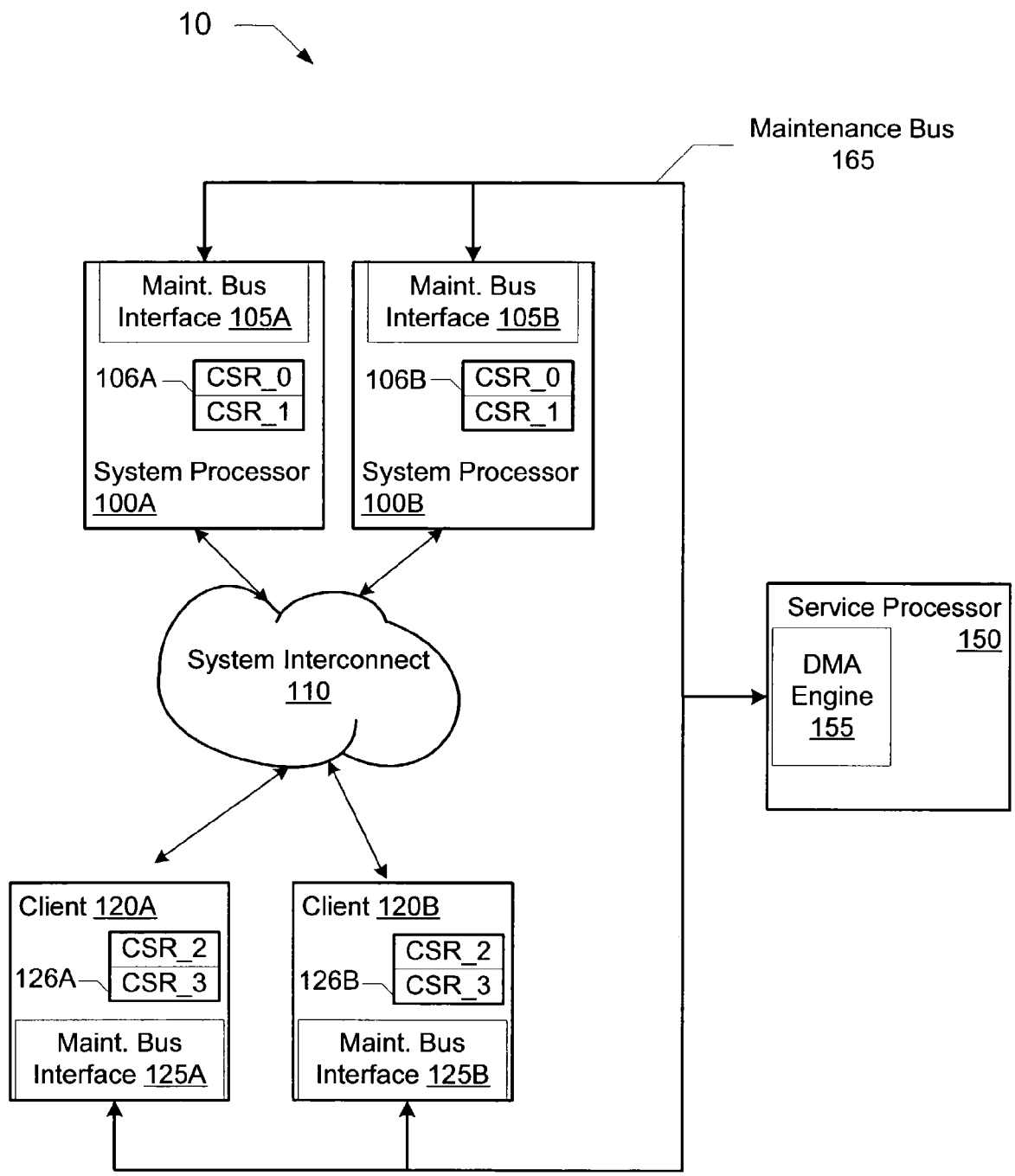
FIG. 1 is a block diagram of one embodiment of a computer system including a service processor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION

System Overview

Turning now to FIG. 1, a diagram of an exemplary embodiment of a computer system is shown. Computer system 10 includes a system processor 100A and a system processor 100B each coupled to a client 120A and 120B via a system interconnect 110. Computer system 10 also includes a service processor 150 that is coupled to each of system processors 100A and 100B and to each of clients 120A and 120B via a maintenance bus 165. It is noted that although two system processors and two clients are shown, it is contemplated that in other embodiments, other numbers of system processors, clients and service processors may be used. Elements referred to herein with a particular reference number followed by a letter may be collectively referred to by the reference number alone. For example, system processor 100A-B may be collectively referred to as system processor 100.

In one embodiment, system processor 100A and 100B may each include one or more microprocessors each representative of a processor in the UltraSparc™ family of processors, although other embodiments are contemplated in which system processors 100A and 100B may include other types of processors. In addition, it is noted that in another embodiment, each of system processors 100A and 100B may be part of respective system processor boards which include system processors 100A and 100B. Further, in the illustrated embodiment, system processors 100A and 100B each include a maintenance bus interface 105A and 105B, respectively. In one embodiment, maintenance bus interface 105A and 105B may be configured to receive and send transactions via maintenance bus 165.

In one embodiment, system processors 100A and 100B may be configured to execute program instructions associated with user applications in a distributed computing environment, where each processor may share the computing load for computer system 10. In other embodiments, computer system 10 may be divided into different domains, such that each domain may include one or more independent system processors and may also include one or more clients. A domain is generally a hardware-isolated entity in which one or more independent operating environments may be run. Thus, each system processor 100 of a given domain may run its own version of the operating system and may thus be configured to run independently of any other domain. For example, one domain may include system processor 100A and client 120A.

Client 120A and 120B may be representative of various types of clients. For example, in one embodiment, either of clients 120A or 120B may be memory clients that may include a memory controller for controlling accesses to an associated system memory. In another embodiment, either of clients 120A or 120B may be input/output (I/O) clients configured to interface to one or more I/O ports such as Infiniband™ ports, for example. In addition, it is noted that in another embodiment, each of clients 120A and 120B may be part of a client board which includes the I/O client components and or the memory client components as desired. Further, clients 120A and 120B may each include a maintenance bus interface 125A and 125B, respectively. In one embodiment, maintenance bus interface 125A and 125B may be configured to receive and send transactions via maintenance bus 165.

System interconnect 110 may be representative of any type of system connection. For example, in one embodiment, system interconnect 110 may include address, data and control buses for routing transactions between system processors 100A-B and clients 120A-B.

In the illustrated embodiment, each of system processors 100A and 100B and clients 120A and 120B include one or more Configuration and Status Registers (CSRs) designated 106A-B and 126A-B, respectively. It is noted that the Configuration and Status Registers of system processors 100 are designated CSR_0 and CSR_1, while the Configuration and Status Registers of clients 120 are designated CSR_2 and CSR_3. As will be described in greater detail below, each identical type of device (e.g., system processor 100A and 100B are virtually identical) may include identical CSRs. Further, a mechanism is available such that these identical CSRs are independently identifiable by software executing on service processor 150. It is noted that although only two CSRs are shown in each device, other embodiments may include multiple CSRs. Generally speaking, the CSRs may control the state of their respective components in computer system 10. For example, the state of each component and therefore its operation may be controlled by manipulating the configuration of each CSR. In addition, the status of system components and system state information may be indicated by certain bits within the CSRs. Accordingly, a CSR may include one or more fields having one or more control bits that control different system functionality. In addition, some CSR bits may be status bits that may be indicative of a state of a particular component.

In one embodiment, service processor 150 may include a processor configured to handle system level tasks such as creating and managing the system domains, system diagnostics, fault analysis and reporting, for example. To perform these types of services, service processor 150 may be configured to access the CSRs and various memory structures of system components (e.g., system processor 100 and client 120). It is noted that in one embodiment, service processor 150 may be part of a service processor board which includes the service processor 150. In such an embodiment, service processor board may include a local memory or memory medium (not shown) for use by service processor 150.

In one embodiment, computer programs according to various embodiments may be stored on the memory medium of service processor 150 for execution by service processor 150. The term "memory medium" may include an installation medium, e.g., a CD-ROM, or floppy disks, a computer system memory such as DRAM, SRAM, EDO DRAM, SDRAM, DDR SDRAM, Rambus RAM, etc., or a non-volatile memory such as a magnetic media, e.g., a hard drive, or optical storage. The memory medium may include other types of memory as well, or combinations thereof.

As will be described in greater detail below, the memory medium preferably stores one or more software programs for event-triggered transaction processing as described herein. The software program(s) may be implemented in any of various ways, including procedure-based techniques, component-based techniques, and/or object-oriented techniques, among others. For example, the software program may-be implemented using C, C++, Java or other technologies or methodologies, as desired. A processor, such as service processor 150, executing code and data from the memory medium may include a means for creating and executing the software program or programs as described below.

In one embodiment, maintenance bus 165 may be a dedicated bus configured to convey transactions between service processor 150 and system processors 100A-B and clients 120A-B independently and without intervention of system processors 100A-B. It is noted that service processor 150 includes a maintenance bus interface, which in the illustrated embodiment is implemented as part of a direct memory access (DMA) engine 155 configured to generate maintenance bus transactions. In the illustrated embodiment, DMA engine 155 may be part of service processor 150, although other embodiments are contemplated in which DMA engine 155 may be part of another component connected to service processor 150. Thus, as will be described in greater detail below, through the use of these maintenance bus transactions, software running on service processor 150 may access and manipulate the CSRs and may thereby manipulate the system state.

Overview of an Operation Description and The Operation Description Language

Figure 2:
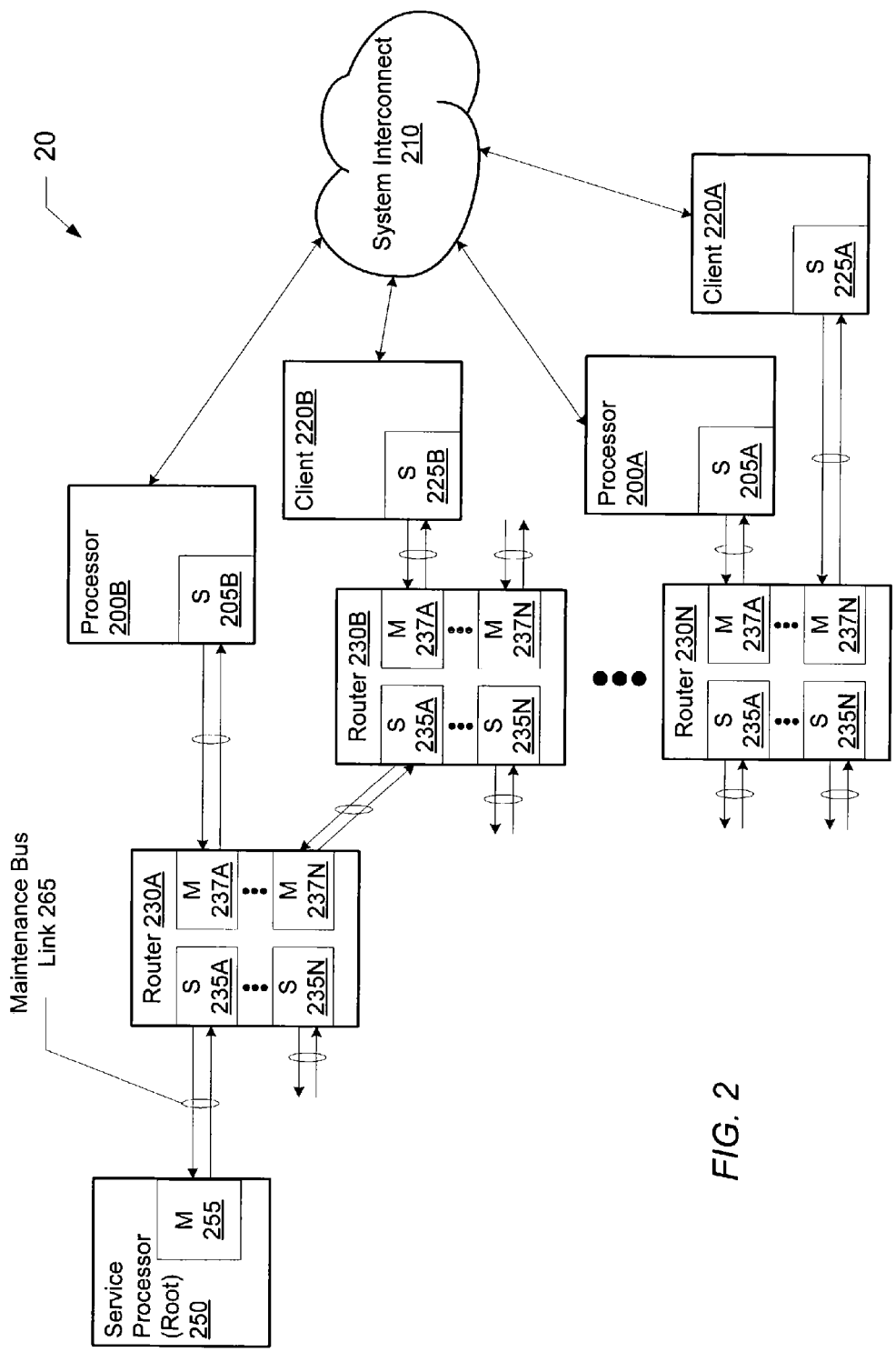
FIG. 2 is a block diagram of one embodiment of a maintenance bus topography of a computer system.

Referring to FIG. 2, a block diagram of another embodiment a computer system is shown. Computer system 20 includes a processor 200A, a processor 200B, a client 220A and a client 220B interconnected via a system interconnect 210. In addition, computer system 20 includes a service processor 250 and routers 230A through 230N, where N refers to any number of routers. Service processor 250 is coupled to router 230A and each router 230 is coupled to each other router via a maintenance bus link 265. Further, processors 200A-B and clients 220A-B are coupled to routers 230 via respective maintenance bus links. It is noted that in alternative embodiments, computer system 20 may include additional service processors. In such alternative embodiments, the additional service processors may be used as redundant components in the event of a failure of a primary service processor.

Similar to the embodiment described in conjunction with the description of FIG. 1, service processor 250 may include a processor configured to handle system level tasks such as creating and managing the system domains, system diagnostics, fault analysis and reporting, for example. To perform these types of services, service processor 250 may be configured to access the CSRs and various memory structures of system components (e.g., processors 200 and clients 220). It is noted that in one embodiment, service processor 250 may be part of a service processor board which includes the service processor 250. In such an embodiment, service processor board may include a local memory or memory medium (not shown) for use by service processor 250. It is noted that service processor 250 includes a maintenance bus interface, which in the illustrated embodiment is designated as M255. M255 is a bus master. In one embodiment, M255 may include a DMA engine similar to DMA engine 155 of FIG. 1. In such an embodiment, the DMA engine may be configured to generate maintenance bus transactions.

In the illustrated embodiment, the various system devices (e.g., processor 200A-B, client 220A-B) are interconnected via maintenance bus links 265 in a fabric or topology resembling a tree structure, where service processor 250 is the root and processors 200A-B and clients 220A-B are the leaves and routers 230 create the branches of the tree. Each of routers 230 include slave and master maintenance bus interfaces and they are designated S235A-N and M237A-N, respectively. Accordingly, not only may a very large number of system devices be interconnected to service processor 250, but depending on the specific topology, a large number of paths may be used to convey transactions to any given component. As described above in conjunction with the description of FIG. 1, the maintenance bus links 265 may provide a dedicated bus configured to convey transactions between service processor 250 and system processors 200A and 200B and between service processor 250 and clients 220A and 220B independently and without intervention of system processors 200A-B. It is also noted that in other embodiments, computer system 20 may include redundant maintenance bus links to provide fault tolerance. Thus, as will be described in greater detail below, through the use of these maintenance bus transactions, software running on service processor 250 may access and manipulate the CSRs and may thereby manipulate the computer system state.

Processors 200A-B and clients 220A-B operate similarly to processors 100A-B and clients 120A-B of FIG. 1. Further, system interconnect 210 may be representative of any type of system connection and may operate similar to system interconnect 110 of FIG. 1. For example, in one embodiment, system interconnect 210 may include address, data and control buses for routing transactions between system processors 200A-B and clients 220A-B.

Figure 3:
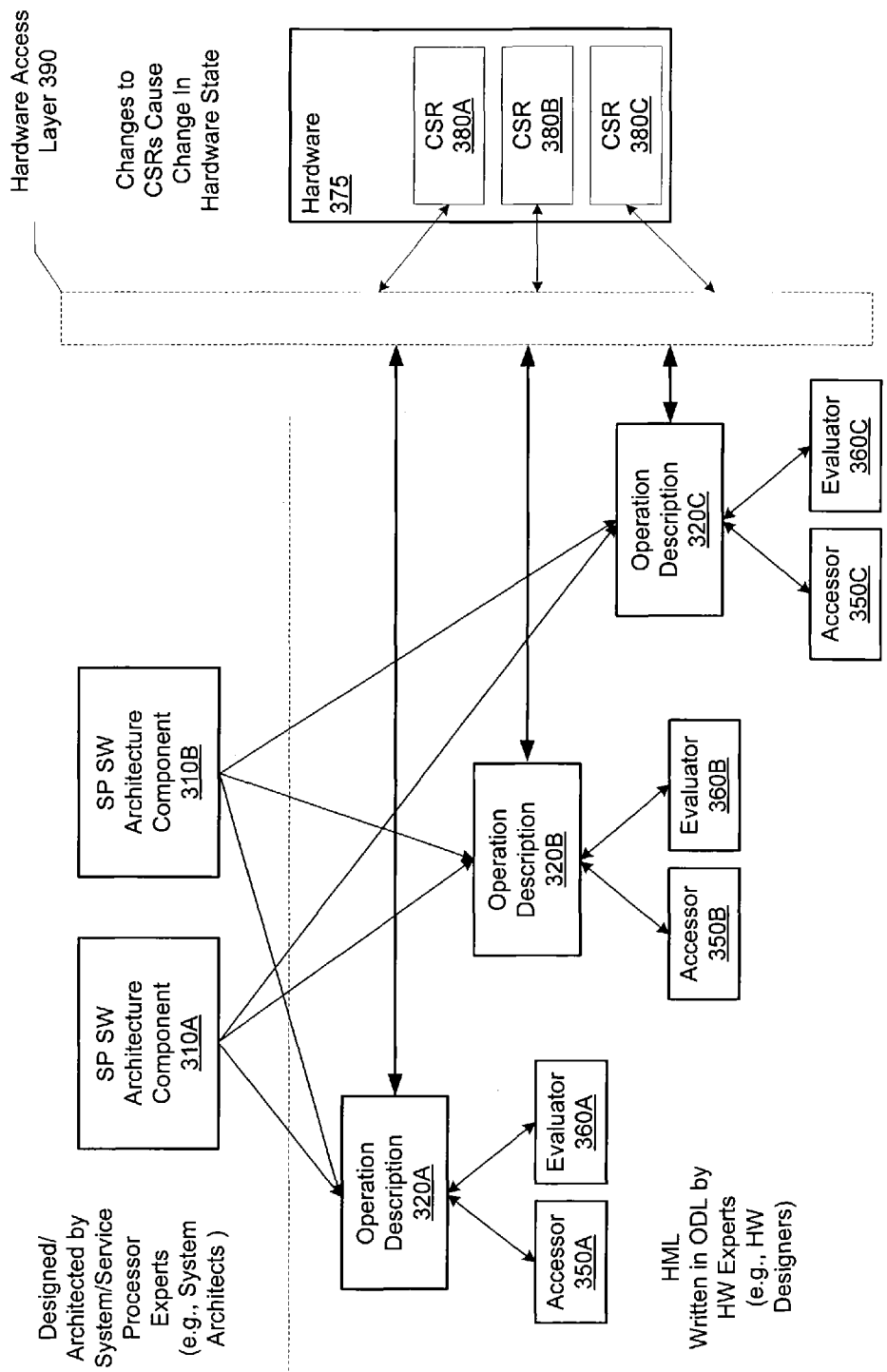
FIG. 3 is a diagram illustrating the relationship of one embodiment of the architectural components for manipulating hardware state.

Turning to FIG. 3, a diagram illustrating the relationship of one embodiment of the architectural components for manipulating hardware state is shown. As described above in conjunction with the descriptions of FIG. 1 and FIG. 2, service processors 150 and 250 may be configured to perform system level tasks such as managing system domains and performing system diagnostics and fault isolation. To perform such tasks, application software may be executed on service processors 150 and 250. Service processor software architecture component 310A and service processor software architecture component 310B are shown as architectural components that may be compiled into application software which may then be executed on service processor 150 and 250 to perform the various tasks described above. However, the details of the hardware implementation and how that hardware is manipulated may be hidden from service processor software architecture component 310A-B by an abstraction of the hardware.

In one embodiment, the abstraction may be a hardware management layer (HML) which may represent sets of hardware components and the various state machines of the hardware components of the system. For example, the HML for computer system 10 may reside within service processor 150 and may represent all the state machines associated with system processors 100A-B and clients 120A-B. Thus, the service processor software architecture component 310A-B may be written by system/design architects that may not have intimate details of the hardware components, but merely the knowledge of the entry points of the HML along with some knowledge of the states to and from which they wish to transition and the workings of the service processor. The HML provides hardware entry points to transition sets of hardware from consistent state to consistent state.

To transition from one state to the next, one or more operations may be performed. The entry points of the HML are the operations and are referred to as operation descriptions (ODs). Generally speaking, the underlying purpose of writing an OD is to specify one or more Transaction Sequences (TSes). Furthermore, TSes are not valuable unless they perform at least one read or write of a CSR. As used herein, a transaction refers to a single command that is issued through the maintenance bus transaction DMA engine (e.g., DMA engine 155). Hence, a TS is an ordered sequence of transactions. An OD is a set of program instructions that specify an algorithm for manipulating hardware or a set of hardware from one consistent state to another consistent state.

Translated and compiled versions of the various ODs that describe the operations are referred to as Implemented Operation Descriptions (IODs) and may be kept in a library included in the HML running on service processor 150. Thus, the service processor software architecture component 310A-B may include program instructions that are interpreted by the HML and that may correspond to one or more hardware specific transactions (as specified in the ODs) that may be performed on a target hardware component.

To provide a rigorous documentation of the comprehensive set of operations which are required to access and manipulate the platform hardware state, ODs may be written and maintained by the experts who are architecting and designing the platform's hardware. From these ODs, expert programmers, testers, etc. may then directly or indirectly derive software, simulations, tests, etc. which may be assured of being correct. Iterative changes to the hardware may be folded into the ODs which may then trickle down in a consistent, meaningful way.

An OD may be thought of as a function that is called to perform the stated operation, and may include a degree of error handling and recovery. Thus, ODs may have input and output parameters, and may call functions, generate events, etc. An OD may hide from the reader of the OD, knowledge of the hardware upon which the OD is running. As described in greater detail below, ODs may only "call" or invoke code segments referred to as Accessors 350A-C, Evaluators 360A-C, and functions defined in a given system's runtime environment specification. As will be described in greater detail below, ODs may not reference a CSR directly; this may be done via Accessors 350 A-C. Specific ODL constructs of Accessors and Evaluators is described below.

It is noted that in one embodiment, when an IOD is run, the various transactions may be handed to a hardware access layer 390 within service processor 150 that may translate the instructions into commands which DMA engine 155 may use to create actual DMA cycles, which in turn may directly access the CSRs.

To effectively write OD algorithms, Accessors and Evaluators a new language is described. The new language encapsulates the types of operations which are done on CSRs, the knowledge of system maintenance bus implementation, and the hardware details of how the maintenance bus transactions are actually executed. This language may provide a hierarchy of "hiding" these layers, and does not pre-suppose an implementation language. This language is named the Operation Description Language (ODL). ODL may provide a simple, expressive way to define algorithms for manipulating the hardware of a machine via its various buses. As described further below, the language, while having formalized grammar is not a language to be compiled directly into an executable. Instead ODs, accessors and evaluators written in ODL may be translated into a compilable language such a C or Java, for example. ODL is a descriptive abstract language designed for the accurate definition of algorithms for accessing hardware using the platform model and hardware device design information directly. So, for example, there may be no string or character types in this language, because they are unnecessary. It is contemplated that the checking of ODs written in ODL for syntactical and semantic correctness, as well as the translation of this language to a high-level programming language, may be performed either by humans or by automatic means.

To couple the actual design of a given system component to the ODs which control them, all or portions of an OD written in ODL may be output directly by a design tool which may generate other hardware description languages such as Verilog™, for example. In one embodiment, the design tool may be an application specific integrated circuit (ASIC) CSR tool that is used for CSR design. In addition, it is contemplated that the design tool may output source code that corresponds to the ODL output.

In one embodiment, the design tool may be a programmable environment and that may produce any sort of output desired including source code in Java, C, C++, etc. In one embodiment, the design tool may be "taught" how to produce Java source files which include name strings, constant variables and class specifications for all the CSRs, as well as all CSR field constants, initialization values, etc. For example, if some of the implementations of ODs will be done in C, then the design tool may generate C header files which may include such definitions as manifest constants and typedef, for example.

As described above, Accessors 350A-C may be the only way to directly read and write hardware structures (e.g., CSR 380A-C). Accessors 350A-C, therefore, may have the property of hiding all of the design tool definitions. To put it another way, the generated ODL output from the design tool may be used exclusively by Accessors 350A-C and Evaluators 360A-C. One benefit of this arrangement may be that the OD itself may now be protected from most changes to the hardware. For example, should a field within a given register change the way it encodes its information, the algorithm for understanding that encoding would be in the given Accessor 350, not in the OD. Thus a change of this nature may only result in having to change the given Accessor 350, not every OD which calls the given Accessor 350. In a sense, an Accessor 350 may be analogous to a function or method called by an OD. Thus, ODs abstract overall hardware set state changes and Accessors abstract CSR accesses.

Evaluators 360A-C may also be used to hide the design tool definitions. The difference between Accessors 350A-C and Evaluators 360A-C is that while Accessors may be used to access the hardware structures (e.g., CSR 380A-C), Evaluators may be used to manipulate the data that is associated with those hardware structures. For example, if a register value is read from CSR 380A using a given Accessor 350, and a particular field needs to be extracted, a particular Evaluator 360 may be called to perform the extraction and to return the field value (or a some representation of the field value). It may be helpful to think of Evaluators 360A-C as the equivalent of parametric macros such as may be defined in the C language. The constants (for things like bit shifts, field masks, etc.) may be defined directly by the design tool, output. Thus, Evaluators abstract CSR composition/decomposition.

In the illustrated embodiment, hardware 375 includes CSRs 380A-C. It is noted that hardware 375 may be representative of any hardware component such as hardware within clients 120A-B or system processors 100A-B of FIG. 1, for example.

The abstraction of the hardware components is illustrated in the following example. When a compiled version of service processor software architecture component 310A-B is executed on service processor 150, for example, service processor 150 may attempt to perform some task such as a diagnostic routine which may check the power status of client 120B. The request for the power status of client 120B may be presented to the HML. In one embodiment, the HML may interpret the request and determine which one or more ODs may be used to perform the task. The HML may use OD 320B, for example. OD 320B may invoke Accessor 350B. Accessor 350B may in turn create the transaction sequence necessary to read a 'power on' status bit such as bit 5 (not shown) within CSRs 380. This transaction sequence may then be handed back to the calling OD (e.g., OD 320B) to run at runtime. When run, the transactions in the sequence may be presented to hardware access layer 390, which may translate the transactions into commands for use by DMA engine 155 to create into DMA cycles. However, it is noted that there is no necessity that the particular client referenced in the call to the OD has the power status bit in it. For example, the power status bit may actually be implemented in a secondary IC located near client 120B. Thus, as described above, the OD can hide the details of where the power status actually resides in much the same way that the Accessors and Evaluators hide the details of the CSR.

It is noted that if the actual design of hardware 375 changes, the change may be transparent to service processor software architecture component 310A. For example, if in the next generation of hardware 375 the 'power on' status bit becomes bit 6, only Accessor 350B may need to be changed to reflect the change. Accordingly, the architects of service processor software architecture component 310A-B may only need to identify code that requests the status of the power of a the hardware component from a high level using the extensive list of operations available to them in the HML, possibly having no knowledge of the hardware specific transactions that may be used to actually read the 'power on' status bit.

The Constructs of ODL

As described above, ODL is a descriptive abstract language designed for the accurate definition of algorithms for accessing hardware using the platform model and hardware device design information directly. Thus, ODL may be referred to as a pseudo-code that may be used to write ODs, Accessors and Evaluators. Below, exemplary code is shown that illustrates the use of ODL to write an OD such as OD 320A-C, an Accessor such as Accessor 350A-C and an Evaluator such as Evaluator 360A-C.

ODL is a strongly typed language. In this context, strongly typed refers to every variable, constant and immediate being declared to be of a certain type. Typing in ODL is based on a very few foundational types such as integers, unsigned integers, and floating point types, for example. In general, the specification of types which are built on these foundational types such as an 'uint2_t', which is a 2-bit unsigned integer, or an 'int8_t', which is an 8-bit signed integer. These sorts of types can be invented as needed as long as there is a precise definition of what the type is. It is noted that since ODL is designed for the manipulation of hardware, types may be of any number of bits and should be precisely matched to the hardware item that is being represented in the variable if any. Thus, it is incorrect when writing a 12-bit field to use a variable of type uint16_t. To the contrary, a correct variable may be typed as uint12_t, for example.

In addition, there are complex types in ODL, which are similar but not identical to C structures or Java Objects. ODL does not have semantics to define a structure, nor are there semantics to directly access members of a complex type. Instead, complex types may simply include a type name, which is a string with '_t' appended to it. Thus, the type name of a complex type may have the form 'string_t' such as 'TS_t', for example. A set of ODL functions operate on the type to set and return elements of the complex type. New complex types may be invented as long as there is a precise definition of the type. For example, in an object-oriented scheme, the data would be encapsulated in the complex type and the set of functions are the methods that manipulate the data.

When needed there are strict rules for defining new complex types (which encapsulate multiple members), which makes them quite distinct from the idea found in the C structure or the Java class. For example, the definition of the type may include a reasonable, descriptive paragraph or section describing the type, which may be added to the ODL specification. In addition, accesses to encapsulated members are not typically made visible, but if they are made visible they are only accessed by functions (i.e. there is no semantic construct in ODL to directly access members of a complex type). Further, the functions which use the type are added to the particular platform ODL Runtime Environment Specification.

In one embodiment, there may be types that are required by the language itself For example, 'csr_t' is an Opaque CSR type, which in one embodiment is always 64 bits and 'boolean_t' is a Boolean type that may be used with #TRUE/#FALSE or #PASS/#FAIL.

Coupling of ODL To The ASIC Design

Because CSR Functions may be used to manipulate the design tool CSR register specifications derived from the ASIC design itself, it may be necessary to have ODL constructs which use the CSR names and field names, for example, directly. By using the design tool output, ODL may be explicitly coupled to the ASIC design. For example, CSR names are produced by the design tool. Accordingly, a CSR typedef-name is the nominal CSR name as created by the design tool with "_csr_t" appended to it. Thus, for example a CSR named 'msmc_timing_reg' may have a corresponding type of 'msmc_timing_reg_csr_t'.

In addition, a CSR name is a cst-identifier, which in its simplest form is merely a string specified by the design tool output with the "@" character prepended to it. Thus for example, if the design tool produces a register csr-identifier 'msmc_timing_reg', then the associated csr-name is '@msmc_timing_reg'.

CSR Operations and Manipulation Grammar

A nuance of Identifiers is found in the notion of a 'csr-identifier', which may only be used in Accessors and Evaluators. In one embodiment, the 'csr-identifier' includes all of the aspects of an ODL identifier, but it can also include integer arithmetic expressions enclosed in "which may be evaluated as integers but directly translated into the character representation of the integer value(s). For example, for an Accessor configured to write a port enable register with the input parameters:

port_enable_reg_csr_t $input_param_csr_value;
uint4_t $portnum;

and a series of port registers which are named by the design tool as: port_enable_reg0, which controls enables for ports 0-3 and port_enable₁reg1, which controls enables for ports 4-7, the Accessor Abstract CSR Operation may have a syntax having the form:

Write (csr-name, variable);

where csr-name is: @csr-identifier. Continuing with the example, we then see the Write operation as:

Write(@port_enable_reg '$portnum/4', $input_param_csr_value); where $input_param_csr_value is of type 'port_enable_reg_csr_t'. Thus if $portnum was set to 5 then port_enable_reg '$portnum/4' would be understood to evaluate to port_enable_reg1 with the integer value of '$portnum/4' being calculated as numerical value 1 but converted to "1" (i.e., ASCII 0x31).

CSR Field names may also be generated by the design tool, and may be used directly. Thus, CSR Field names are simply identifiers similar to nominal CSR names described above. A CSR Field may be used on the left or right hand side of an expression with 'csr-variable.csr-field-name'. Extending our previous example, a CSR 'msmc_timing_reg' might have fields 'mtr_timeout', 'mtr_refresh', and 'mtr__wire'. References to these fields would be:

$msmc_timing_reg.mtr_timeout
$msmc_timing_reg.mtr_refresh
$msmc_timing_reg.mtr_wire A field assignment is a special concept of ODL which may allow the value of individual fields of a CSR or CSR variable to be set. In one embodiment, CSR Field Assignments may look like this:

csr-field-name: expression and a Field Assignment List may be of the form:

{csr-field-name1: expression1, csr-field-name2: expression2, . . . }

As an example, here is a case where the "?:" ternary operator is being used within an Abstract CSR Write operation to set a series of bits in a group. The LINK_ACTIVATEn fields (where n=0, 1, etc.) within the imaginary msmc_link_cntrl register: input parameters are:

```
uint1_t $enable_Data;
uint5_t $enableSlices;
Write( msmc_link_cntrl,
{
LINK_ACTIVATE0 : $enable_Data ? ($enableSlices & 5×1) : 1b0,
LINK_ACTIVATE1 : $enable_Data ? ($enableSlices & 5×2) >> 1 : 1b0,
LINK_ACTIVATE2 : $enable_Data ? ($enableSlices & 5×4) >> 2 : 1b0,
LINK_ACTIVATE3: $enable_Data ? ($enableSlices & 5×8) >> 3: 1b0,
LINK_ACTIVATE4 : $enable_Data ? ($enableSlices & 5×10) >> 4 :
1b0
}
);
```

There is an additional syntactical element which may be permitted within CSR Operations: the ellipsis (". . ."). In one embodiment, the ellipsis operator may only be valid in a CSR Operation when making use of arrays and CSR Fields to indicate a contiguous number of elements in the array. Although there may be many forms, a few examples are:

'$array[2 . . . 5]= . . . ';
or
'$array[$minIndex . . . $maxIndex]= . . . ';
or
'$array[#portMax . . . #portMin]= . . . ';

It is noted that in the third example the indexes operate in descending order. However, either ascending or descending order is acceptable.

The following example illustrates using the ellipsis for field assignments in a single write statement to provide a convenient way of expressing the same five field assignments shown above. The input parameters are:

uint1_t $enable_Data;
uint5_t $enableSlices;
Write(msmc_link_cntrl,
    LINK_ACTIVATE'4 . . . 0': $enable_Data? $enable-
       Slices: 5b00000);

The scope of CSR functions may be limited according to the type of hardware on which the function operates. For example, a system processor 100A-B Accessor may not operate on client 120A-B. Thus, the CSR function type may be specified by a Hardware Function Programming Interface (HFPI) type. The HFPI corresponds to a particular partition of functionality within the implemented hardware component type. The totality of the accessible parts of a device such as processor 100, for example, may be constituted of one or more HFPIs. For example, in one embodiment, a system interconnect interface of system processor 100 may be an HFPI type. This may be the same system interconnect interface included within client 120. Thus, each of system processors 100A-B and clients 120A-B may include the same system interconnect HFPI.

Using an HFPI type may allow for identically named Accessors and Evaluators in multiple HFPI types to be differentiated. In other words, functions common to different subsets of hardware components may all be grouped together and given a name space. Additionally, functions having the same semantic effect but different implementations (due for example to different hardware CSR arrangements) may be given the same name in different HFPIs. Accordingly, CSR_0 and CSR_1 of system processors 100A-B of FIG. 1 may be differentiated.

Coupling of ODL To The Computer Model

It is noted that in one embodiment, ODL may also be explicitly coupled to the computer system design via a Common Information Model (CIM) representation. Since ODL is a strongly typed language, each HW device (CIM Class) has a unique type. Because there may be so many CIM Classes, and because the CIM Classes may change over the life of the product, a convention for developing data types from the CIM Schema may be used. In addition, there may be times when it is necessary to hold or pass an object without knowing what type it is. Another possibility may be that an array of heterogeneous objects needs to be created. For these kinds of circumstances it may be necessary to have an opaque CIM Class type which supports such needs. Thus, an opaque CIM class type, which is defined as 'cim_t', may provide a generic type so that a variable or array of this type can hold any specific CIM Class type. Accordingly, in one embodiment, for each CIM Class, there may be a corresponding ODL type that may be created by appending "_cim_t" to the CIM Class name. Thus, a CIM class type may have the form 'cim-class-name_cim_t'. For example, in one embodiment, there may be temperature sensors located in many locations in computer system 10 of FIG. 1. In the system CIM Schema these sensor objects may be named CIM_TemperatureSensor. Therefore, a variable of this object type would be of the form CIM_TemperatureSensor_cim_t $tsensor;

As described above Accessors may be the only place in the ODL where direct access to hardware CSRs is specified. ODs are only permitted CSR access by calling Accessors via a transaction sequence specification (TSS) Accessor translation command.

As described above, an OD specifies one or more Transaction Sequences (TSes) which perform at least one read or write of a CSR. To perform transactions across the maintenance bus requires the invocation of at least one Accessor. An Accessor accepts a set of input parameters and includes CSR information provided by the design tool. Accessors may perform operations on those parameters to manipulate them or create new values before use in a special group of CSR Operations. These transaction functions are evaluated by OD TSS function calls to produce TSes representing actual maintenance bus operations.

There are many types of read and write commands available for the maintenance bus. In one embodiment, a compression of the available maintenance bus commands may be performed in order to optimize the Accessor invocation command to a minimum set. Accessor Abstract CSR Operations express operations using only generic reads and writes, not as Native maintenance bus operations. These Abstract maintenance bus operations are translated into Native maintenance bus operations to be meaningful. As used herein a Native maintenance bus operation refers to maintenance bus operations which specify the precise type of maintenance bus operation to be performed on a given type of machine and therefore a given type of maintenance bus. Native maintenance bus operations may not be translated into other types of operations. In one embodiment, Abstract CSR Operations may be translated into Native maintenance bus operations using a translation-directive table (not shown), which describes the relationship between the translation-directive used in a given Accessor invocation command, and the command which will thus be used in the individual transactions.

It is noted that TSes do not perform accesses to the HW until they are run using an ODL function which passes the TSes to the abstracted maintenance bus scheduler to be run. In one embodiment, this is referred to as the Run_TS function. This function hides the details of the service processor scheduling methodology and the maintenance bus route hardware and the DMA engine 155 of FIG. 1. Therefore, any values which TSes return from reading the hardware may not be available until after the TS has been run and returns successfully. Values returned from reading hardware registers are referred to as "posted" return values since it is known what is supposed to be available at the time each TS is constructed but the values do not become actualized until some time in the future when the TS is run.

To construct a valid TS, an OD explicitly calls TSS functions in their proper order to produce this precise TS structure. It is possible for an OD to construct many TSes or to construct multiple TSes simultaneously, but each TS should abide by this structural definition. In addition, only complete, valid TSes may be submitted by the OD for execution by the Run_TS built-in ODL Function.

In one embodiment, the Run_TS function may return information that is intended to be consumed at different levels. To encapsulate all of the status and posted information associated with the entire Run_TS context, a TS_State_t compound type was created. The TS_State_t may be used by the OD to extract the overall and individual TS state information. For example, the overall status of the Run_TS invocation may be extracted from TS_State_t and used by the OD so that error handling may be specified. Similar to the overall status, the individual status may be needed by the OD level to support specification of error handling at the granularity of the TS when a Run_TS invocation runs multiple TSes. In addition, the values for the Accessors' posted parameters is intended for exclusive consumption by Accessors and Evaluators, not in the OD body. As described above, the purpose of Accessors and Evaluators is to hide CSR knowledge from the OD, and posted parameters are predominantly CSR values. In one embodiment, to extract posted information stored within TS_State_t while hiding CSR knowledge from the OD, the OD may pass specific TS_State_t information to the Evaluator; thereby allowing the Evaluator to perform the extraction.

In the following specific example, one embodiment of a code sequence of an exemplary OD such as OD 320A-C of FIG. 2 is shown. In the example, the OD, which is used to read a temperature associated with a hardware component such as hardware 375 of FIG. 2 includes comments. The OD also calls an Accessor and an Evaluator. The code for the Accessor and Evaluator is also shown below. In the example, the hardware component (referred to in this coding example as an ASIC) may support a Common ASIC Function (CAF) HFPI. In one embodiment, system processor 100 and client 120 of FIG. 1 may each include one or more ASICs.

As noted in the example, in one embodiment, the CAF includes a definition of a temperature register that provides an encoding of the current temperature that may be converted into any temperature units desired. The temperature register may be found in any of the hardware components that support CAF.

EXAMPLE OD

```
/****************************************************************
Detailed Description: OD_asic_temperature_read
This OD is used to read an the temperature of any ASIC which supports the
Common ASIC Function (CAF) Hardware Function Programming Interface (HFPI).
The CAF includes a temperature register which provides an encoding of the current
ASIC temperature which can be converted into any temperature units desired.
Assumptions:
$client is a client device
All CAF chips have the same temperature register at the same maintenance bus address
offset. All CAF temperature registers used the same mathematical formula to convert
CSR value to floating point temperature. $client is powered on. There is no need to
lock $client to read the temperature.
Limitations: This is a simplified "happy path" OD.
****************************************************************/
OD_asic_temperature_read (SP_Client_cim_t $client)
    returns {float_t $aveCelsiusTemperature,
                    float_t $peakCelsiusTemperature,
                    boolean_t $returnStatus}
{
    DIR ( Idempotent: #TRUE );
    float_t $aveTemp; // average temperature of chip in degrees Celsius
    float_t $peakTemp; // peak temperature of chip in degrees Celsius
    TS_t $readTemp = TSS_Start ( ); // Init the TS to read the temperature
    TS_State_t $readTemp_TS_State; // Status from running the $readTemp TS
    boolean_t $status; // returned status of CAF.convertTempToCelsius
    { $readTemp +: ATS } = TSS_TS ( #TS_NORMAL, $client, CAF.getTemperature ( ) );
    $readTemp += TSS_End ( ); // No wait at TS conclusion is necessary
    $readTemp_TS_State = Run_TS ( $readTemp, #RUN_TS_BLOCK ); // Run it!
    if ( #TS_PASSED == TS_Status ( $readTemp_TS_State ) )
    {
        /* call the Evaluator to convert the CSR value to degrees Celsius */
        { $status : status,
            $aveTemp : aveTempCelsius, $peakTemp : peakTempCelsius } =
                CAF.convertTempToCelsius ( $readTemp_TS_State, 0 );
        if( #PASS = $status ) {
            $aveCelsiusTemperature = $aveTemp;
            $peakCelsiusTemperature = $peakTemp;
            $returnStatus = #PASS;
        } else {
            // Report failure
            $returnStatus = #FAIL;
```

```
            }
    } else {
            // Report failure
            $returnStatus = #FAIL;
    }
    return;
}
```

Next, one embodiment of a code segment of an exemplary Accessor such as Accessor 350A-C of FIG. 2 is shown in the following code sequence.

EXAMPLE ACCESSOR CODE

```
/****************************************************
This Accessor reads the temperature information from the Common ASIC
Function temperature register caf_ct_tempcell.
Assumptions:
All Common ASIC Function CSR names from the design tool have "caf_" prepended
rather than the ASIC name.
****************************************************/
Accessor CAF.getTemperature ( )
        posts { caf_ct_tempcell_csr_t $tempcell }
{
        DIR (Translation: #TST_NORMAL ) {
            $AStatus = #FAIL;
            return;
        }
        $tempcell = Read (@caf_ct_tempcell);
}
```

In the next example, one embodiment of a code segment of an exemplary Evaluator such as Evaluator 350A-C of FIG. 2 is shown.

EXAMPLE EVALUATOR CODE

```
/****************************************************
This Evaluator takes the temperature CSR read by the CAF.getTemperature Accessor
and extracts both the averaged (t_qual) and peak (t_peak) fields, translates them into
floating point Celsius values, and returns them.
Assumptions:
The formula for conversion of the 8-bit temperature value to Celsius is expressed with
the following formula. The actual formula is determined by the ASIC vendor: celsius-
degrees = (0.470588 * 8-bit-value) − 20
****************************************************/
Evaluator CAF.convertTempToCelsius (TS_State_t $tsState, uint8_t $tsIndex)
        returns { float_t $aveTempCelsius,
            float_t $peakTempCelsius,
            boolean_t $status }
        {
            DIR ( Assertion: 0 == $tsIndex ) {
                $status = #FAIL;
                return;
            }
            DIR ( Assertion: #TS_PASSED == TS_Status ( $tsState, $tsIndex ) ) {
                $status = #FAIL;
                return;
            }
            caf_ct_tempcell_csr_t $tempcell;
            float_t #TEMPCELL_SLOPE = 0.470588;
            float_t #TEMPCELL_INTRCPT = −20.0;
            /*
             * since CAF.getTemperature( ) only returns one posted parameter
             * it is not required to use the tagged variable list syntax which
             * would make the LHS of the following command
             * { $tempcell : tempcell } = TS_ExtractPostedParams...
             */
```

-continued

```
        $tempcell = TS_ExtractPostedParams ( $tsState, $tsIndex, 0 );
        $aveTempCelsius = ( #TEMPCELL_SLOPE * $tempcell.t_qual) -
                                            #TEMPCELL_INTRCPT;
        $peakTempCelsius = ( #TEMPCELL_SLOPE * $tempcell.t_peak) -
                                            #TEMPCELL_INTRCPT;
        $status = #PASS;
        return;
    }
```

Figure 4:
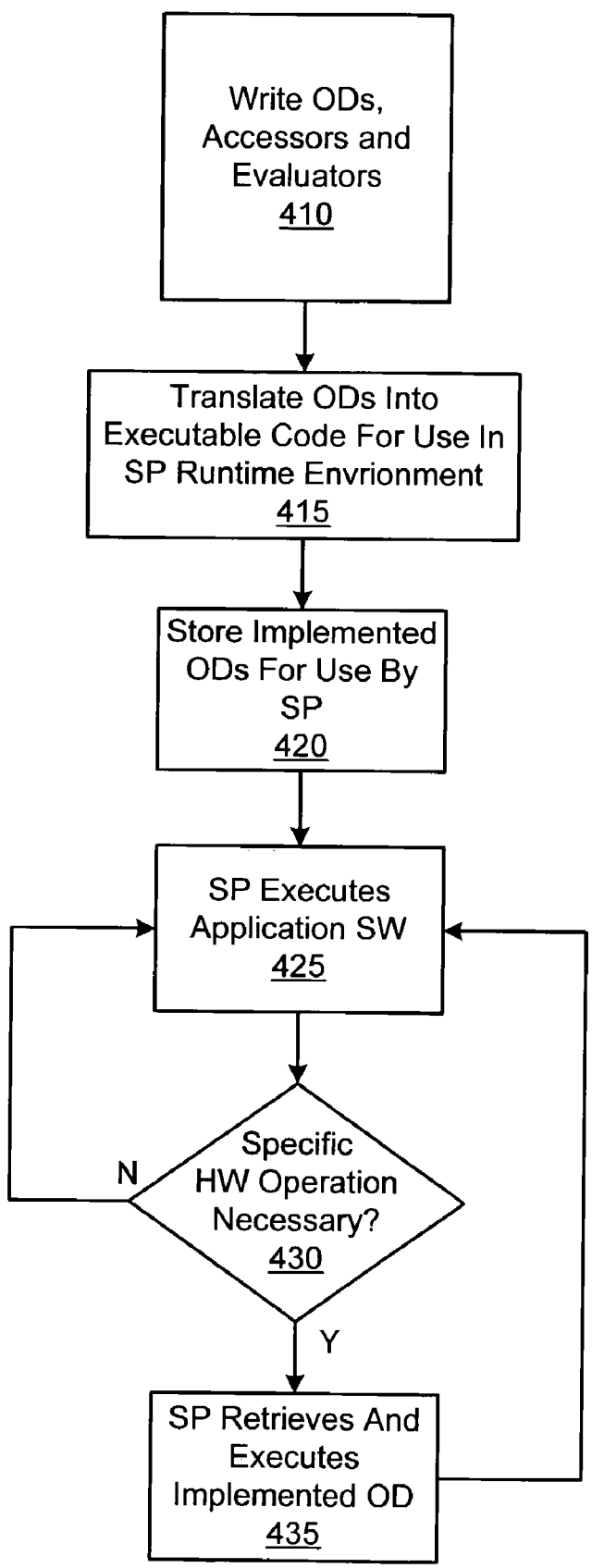
FIG. 4 is a flow diagram illustrating the development and use of operational descriptions to manipulate hardware state.

Turning to FIG. 4, a flow diagram illustrating the development and use of ODs to manipulate hardware state is shown. Beginning in block 410, the ODs, Accessors and Evaluators are written in ODL. ODs are typically written using information available from various reference manuals and from the hardware design teams. For example, the definitions of all bus topologies may be used. The design tool output, in ODL, of hardware specific information such as CSR names, field names, etc. is used since it is an ODL representation of the actual hardware design. The various hardware specifications are also used. In addition, programmer's reference manual(s), the platform CIM schema and the various programming models which provide the system state machines may also be used. Further, an ODL specification, a platform OD writer's guide and any platform ODL runtime environment documents may be used as guides. Thus, the information gathered from all of these sources may be used to write ODs. Once the ODs, Accessors and Evaluators are written they may be translated and compiled into an executable form such as C or Java, for example (block 415). As described above, the translated and compiled ODs are referred to as Implemented ODs (IODs). The IODs may be stored for use by the SP. Accordingly, the IODs are, in a sense, a library of ODs available for use by application software executing on the service processor (block 420).

During operation in the runtime environment, service processor 150 of FIG. 1, may be executing various application software routines that may be configured to perform tasks such as domain management, fault diagnosis and general system level monitor functions, for example (block 425). As the application software runs, it may be necessary to perform a task requiring accessing or manipulating a hardware device such as a system processor 100 or a client 120, for example. Thus, the library of IODs, which includes all the IODs available to service processor 150 may interpret a command issued by the application software and determine that one or more IODs are necessary to perform the task (block 430). One or more of the IODs may be executed to perform the necessary access or manipulation (block 435). As described above, prior to being translated and compiled, the ODs describe the algorithms for manipulating the hardware. These algorithms are converted into sequences of transactions that are to be conveyed on maintenance bus 165. During run time, the actual transactions are conveyed on maintenance bus 165 and the various CSRs may be accessed. Once a given transaction sequence has completed, the application software may continue to execute as described above in block 425.

Various embodiments may further include receiving, sending or storing instructions and/or data implemented in accordance with the foregoing description upon a carrier medium. Generally speaking, a carrier medium may include storage media or memory media such as magnetic or optical media, e.g., disk or CD-ROM, volatile or non-volatile media such as RAM (e.g. SDRAM, DDR SDRAM, RDRAM, SRAM, etc.), ROM, etc. as well as transmission media or signals such as electrical, electromagnetic, or digital signals, conveyed via a communication medium such as network and/or a wireless link.

Although the embodiments above have been described in considerable detail, numerous variations and modifications will become apparent to those skilled in the art once the above disclosure is fully appreciated. It is intended that the following claims be interpreted to embrace all such variations and modifications.

What is claimed is:

1. A method comprising:
a service processor executing application software for configuring a computer system into one or more domains and for performing diagnostics;
providing program instructions comprising operational descriptions that invoke one or more hardware access code segments that provide, to said program instructions, one or more specific transaction sequences to access and manipulate one or more respective registers within a system processor and a client;
wherein said program instructions comprise a first level of hardware abstraction that hides specific hardware functionality from the application software;
wherein said one or more hardware access code segments comprise a second level of hardware abstraction that hides specific register access information from said program instructions;
translating said program instructions into an executable form; and
executing said executable form of said program instructions to manipulate said hardware components of said system from one consistent state to a next consistent state in response to execution of said application software.

2. The method as recited in claim 1, wherein to access and manipulate one or more respective registers includes reading and writing information within one or more control registers.

3. The method as recited in claim 1, wherein said system processor and said client each include one or more state machine implementations each including a plurality of states and wherein said plurality of states are effected in response to invocation of said one or more code segments.

4. The method as recited in claim 1, wherein said specific register access information includes control register-specific information.

5. The method as recited in claim 4, wherein said control register-specific information includes a control register name.

6. The method as recited in claim 5 further comprising specifying said control register name using an integer arithmetic expression that is evaluated as an integer value and translated into a character representation of said integer value.

7. The method as recited in claim 4, wherein said control register-specific information includes a control register field including one or more particular bits.

8. The method as recited in claim 7 further comprising specifying and writing a predetermined value to said control register field using a field assignment including a name of said control register field and an expression including a variable representative of said one or more particular bits being written.

9. The method as recited in claim 1 further comprising deriving said specific register access information associated with particular hardware components from an output of a design tool, wherein said output corresponds to a hardware definition language representation of said hardware components.

10. The method as recited in claim 1, wherein describing said sequence of one or more transactions for manipulating hardware components includes specifying an access operation on a given control register without defining a specific bus route for conveying said operation.

11. The method as recited in claim 1 further comprising storing a value in a storage variable during a transaction, wherein said value is accessible by an instruction executed subsequent to completion of said transaction.

12. The method as recited in claim 1, wherein said program instructions are written in a descriptive abstract programming language that is not directly compilable.

13. The method as recited in claim 1 further comprising deriving said specific information associated with particular hardware components from a computer information model (CIM) representation by associating each particular hardware component with a CIM class having a CIM class name and creating, for each CIM class, a corresponding unique type by appending "_cim_" to said CIM class name.

14. The method as recited in claim 1 further comprising specifying a hardware function programming interface type that corresponds to a particular partition of functionality within a given hardware component type, wherein two identically named hardware access code segments have substantially a same semantic effect and different implementations when called by two different hardware function programming interfaces.

15. A computer system comprising:
a system processor configured to execute instructions associated with user software;
a client coupled to said system processor via a system interconnect; and
a service processor coupled to said system processor and to said client via a maintenance bus, wherein said service processor is configured to execute application software for configuring said computer system into one or more domains and for performing diagnostics;
wherein said service processor is further configured to:
execute an executable form of program instructions for manipulating said system processor and said client from one consistent state to a next consistent state in response to execution of the application software;
wherein said program instructions comprise a first level of hardware abstraction that hides specific hardware functionality from the application software;
wherein said program instructions comprise operational descriptions that invoke one or more hardware access code segments that provide, to said program instructions, one or more specific transaction sequences to access and manipulate one or more respective registers within said system processor and said client; and
wherein said one or more hardware access code segments comprise a second level of hardware abstraction that hides specific register access information from said program instructions.

16. The computer system as recited in claim 15, wherein said system processor and said client each include one or more respective control registers, wherein said respective control registers include one or more bits configured to control and indicate an operating state of said system processor and said client.

17. The computer system as recited in claim 16, wherein said service processor is further configured to read and write information within said one or more respective control registers of said system processor and said client.

18. The computer system as recited in claim 15, wherein said system processor and said client each include one or more state machine implementations each including a plurality of states and wherein said plurality of states are effected in response to invocation of said one or more hardware access code segments.

19. The computer system as recited in claim 15, wherein said specific register access information includes control register-specific information.

20. The computer system as recited in claim 19, wherein said control register-specific information includes a control register name.

21. The computer system as recited in claim 20, wherein said program instructions include specifying said control register name using an integer arithmetic expression that is evaluated as an integer value and translated into a character representation of said integer value.

22. The computer system as recited in claim 20, wherein said control register-specific information includes a control register field including one or more particular bits.

23. The computer system as recited in claim 22, wherein said program instructions include specifying and writing a predetermined value to said control register field using a field assignment including a name of said control register field and an expression including a variable representative of said one or more particular bits being written.

24. The computer system as recited in claim 15, wherein said specific register access information associated with said system processor and said client is derived from an output of a design tool, wherein said output corresponds to a hardware definition language representation of said system processor and said client.

25. The computer system as recited in claim 15, wherein said program instructions include specifying an access operation on a control register without defining a specific bus route for conveying said operation.

26. The computer system as recited in claim 15, wherein said program instructions include storing a value in a storage variable during a transaction, wherein said value is accessible by an instruction executed subsequent to completion of said transaction.

27. The computer system as recited in claim 15, wherein said program instructions are written in a descriptive abstract programming language that is not directly compilable.

28. The computer system as recited in claim 15, wherein said specific information associated with particular hardware components is derived from a computer information model (CIM) representation by associating each particular hardware component with a CIM class having a CIM class name and creating, for each CIM class, a corresponding unique type by appending "_cim_t" to said CIM class name.

29. The computer system as recited in claim 15, wherein a hardware function programming interface type is specified that corresponds to a particular partition of functionality within a given hardware component type, wherein two identically named code segments have a substantially same semantic effect and different implementations when called by two different hardware function programming interfaces.

* * * * *

UNITED STATES PATENT AND TRADEMARK OFFICE
CERTIFICATE OF CORRECTION

PATENT NO. : 7,367,016 B2
APPLICATION NO. : 10/618829
DATED : April 29, 2008
INVENTOR(S) : Meyer et al.

It is certified that error appears in the above-identified patent and that said Letters Patent is hereby corrected as shown below:

In the Claims:

Claim 13, col. 19, line 30, please delete "appending "_cim_" to said CIM class name." and substitute --appending "_cim_t" to said CIM class name.--

Signed and Sealed this

Twenty-ninth Day of July, 2008

JON W. DUDAS
*Director of the United States Patent and Trademark Office*